(12) United States Patent
Chapin et al.

(10) Patent No.: US 8,950,961 B2
(45) Date of Patent: Feb. 10, 2015

(54) METHODS AND APPARATUS FOR APPLYING FILLER MATERIAL ONTO AN OBJECT

(75) Inventors: Curtis M. Chapin, Fort Worth, TX (US); Sarah Sutton, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 476 days.

(21) Appl. No.: 13/159,362

(22) Filed: Jun. 13, 2011

(65) Prior Publication Data

US 2012/0315406 A1 Dec. 13, 2012

(51) Int. Cl.
 *B43M 1/02* (2006.01)
 *F16J 15/14* (2006.01)
 *F16B 1/00* (2006.01)

(52) U.S. Cl.
 CPC .......... *F16J 15/14* (2013.01); *F16B 2001/0035* (2013.01)
 USPC .............................................. 401/1; 219/228

(58) Field of Classification Search
 USPC ............. 401/1, 3; 222/146.2, 146.5; 411/377; 425/3; 219/228, 229; 427/598
 See application file for complete search history.

(56) References Cited

U.S. PATENT DOCUMENTS

| RE24,066 E | 10/1955 | Brown |
|---|---|---|
| 3,230,817 A | 1/1966 | Thomas |
| 3,662,152 A | 5/1972 | Weller et al. |
| 3,707,894 A | 1/1973 | Stillwagon, Jr. |
| 3,990,623 A | 11/1976 | Fortune |
| 4,167,259 A * | 9/1979 | Bury ........................... 248/205.3 |
| 4,771,161 A * | 9/1988 | Levy et al. ..................... 219/228 |
| 4,884,929 A | 12/1989 | Smith et al. |
| 5,391,028 A | 2/1995 | Charles |
| 5,705,795 A | 1/1998 | Anderson et al. |
| 6,496,094 B2 | 12/2002 | May, III |
| 6,679,667 B2 | 1/2004 | Brown et al. |
| 2003/0146262 A1 | 8/2003 | Hwang et al. |
| 2010/0078037 A1 | 4/2010 | Mukai |
| 2011/0284517 A1* | 11/2011 | Hsu ................................ 219/229 |
| 2012/0234488 A1* | 9/2012 | Ulicny et al. ............... 156/272.4 |

FOREIGN PATENT DOCUMENTS

JP 2007-105757 4/2007

OTHER PUBLICATIONS

Magnetic bit and screw holder, web link: www.rapidonline.com/1/1/4071-magnetic-bit-screw-holder.html, Oct. 6, 2010, 2 pages.

* cited by examiner

*Primary Examiner* — David Walczak
*Assistant Examiner* — Bradley Oliver
(74) *Attorney, Agent, or Firm* — McDermott Will & Emery LLP

(57) ABSTRACT

Methods and apparatus for applying filler material onto an object are provided. An apparatus may include a body and an applicator head attached to the body. The apparatus may also include a magnetic member coupled to the applicator head and arranged to attract filler material to a heating surface of the applicator head. The applicator head may be configured to apply the filler material attracted to the heating surface against an object. The heating surface may be configured to apply heat to the filler material attracted to the heating surface to melt the filler material onto the object.

20 Claims, 7 Drawing Sheets

METHODS AND APPARATUS FOR APPLYING FILLER MATERIAL ONTO AN OBJECT

STATEMENT AS TO RIGHTS TO INVENTIONS MADE UNDER FEDERALLY SPONSORED RESEARCH OR DEVELOPMENT

This invention was made with Government support under Contract Number N00019-02-C-3002 awarded by The Department of the Navy. The Government has certain rights in this invention.

FIELD

The present invention generally relates to methods and apparatus for applying filler material onto an object.

BACKGROUND

On aircraft and other items requiring a smooth surface finish, filler material may be used to smooth over fasteners or other surface imperfections. The filler material are typically in disk form to fill the heads of the fasteners. These disks may be melted in place using a hot iron at a high temperature. The disks are typically hand-held in place while the disks are melted. Applying the filler material in this manner makes positioning the disks difficult, and also poses a significant risk of burns to the hands, especially when the filler material is applied on vertical and overhead surfaces.

SUMMARY

Aspects of the subject technology take advantage of the magnetic characteristics of the filler material, which allows the filler material to be attracted to a magnet. In some aspects, a magnet is imbedded in the head of a hot iron so that the filler material can be picked up using the hot iron and positioned over a fastener on an object. Picking up and positioning the filler material in this manner reduces the risk of burns to the hands of a user of the hot iron and also allows for better control in the placement and positioning of the filler material.

According to various aspects of the subject technology, an apparatus for applying filler material onto an object is provided. The apparatus may comprise a body and an applicator head attached to the body. The apparatus may also comprise a magnetic member coupled to the applicator head and arranged to attract filler material to a heating surface of the applicator head. The applicator head may be configured to apply the filler material attracted to the heating surface against an object. The heating surface may be configured to apply heat to the filler material attracted to the heating surface to melt the filler material onto the object.

According to various aspects of the subject technology, a method for applying filler material onto an object is provided. The method may comprise positioning a heating surface of an applicator head adjacent to filler material, and attracting, using a magnetic member coupled to the applicator head, the filler material to the heating surface of the applicator head. The method may comprise applying the filler material attracted to the heating surface against an object, and applying, using the heating surface of the applicator head, heat to the filler material attracted to the heating surface to melt the filler material onto the object.

According to various aspects of the subject technology, an apparatus for applying filler material onto an object is provided. The apparatus may comprise a body and an applicator head attached to the body. The apparatus may also comprise a magnet embedded in a cavity of the applicator head and arranged to attract filler material to a heating surface of the applicator head. The applicator head may be configured to apply the filler material attracted to the heating surface against an object. The heating surface may be configured to apply heat to the filler material attracted to the heating surface to melt the filler material onto the object. A Curie temperature of the magnet may be greater than a melting temperature of the filler material.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
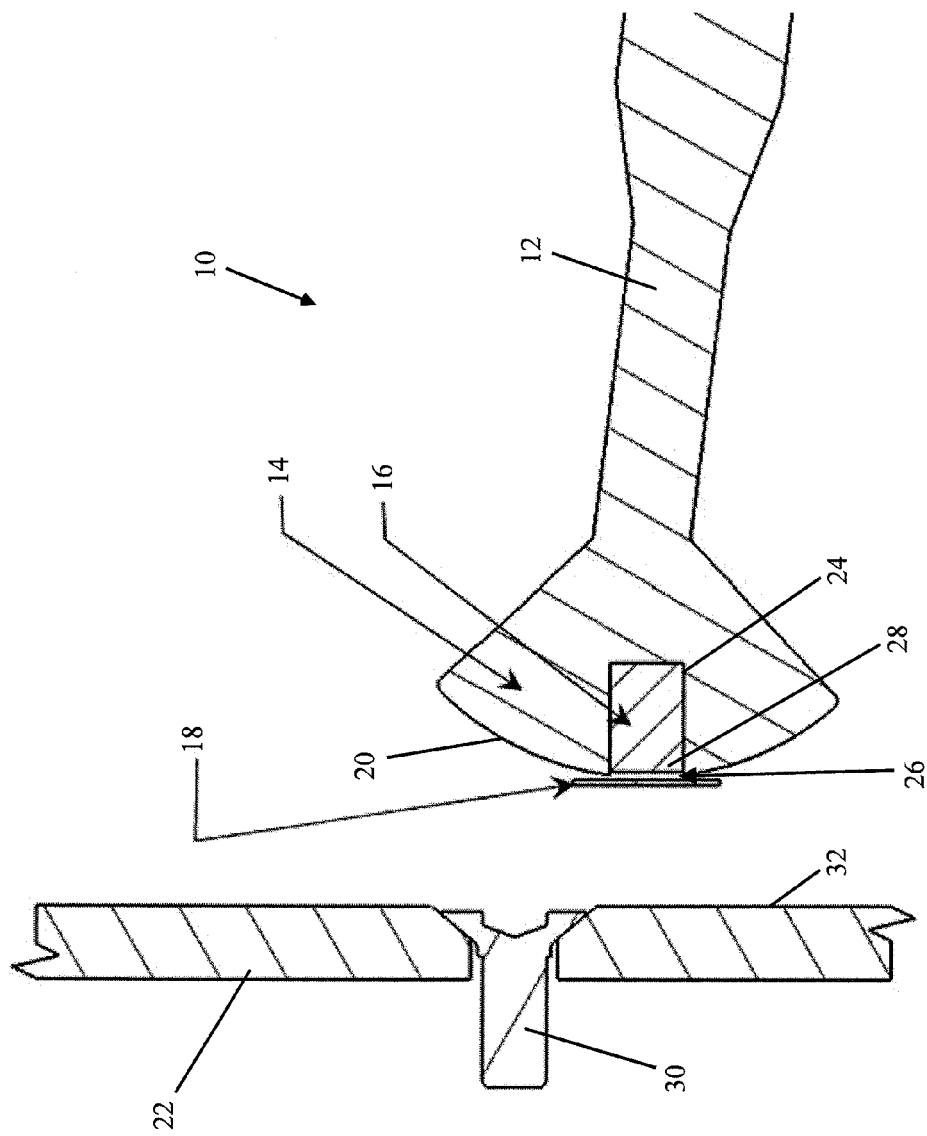
FIG. 1 illustrates a side view of an example of a hot iron, in accordance with various aspects of the subject technology.

Aspects of the subject technology provide a hot iron that beneficially allows a user to pick up filler material and apply the filler material onto an object without risking injury to the user. By taking advantage of the magnetic characteristics of the filler material, a magnetic source may be used to attract the filler material to the head of the hot iron so that the filler material can be picked up with ease. FIG. 1 illustrates a side view of an example of hot iron 10, in accordance with various aspects of the subject technology. Hot iron 10 can be used to apply filler material 18 onto object 22. Object 22 can be an aircraft, an automobile, a boat, any other suitable vehicle, or any other object in which filler material 18 may be used to smooth a contour of the object. For example, filler material 18 can be applied over a countersunk portion of fastener 30 on object 22 in order to smooth surface 32 of object 22.

Hot iron 10 comprises body 12 (e.g., an elongate member, shaft, etc.) and applicator head 14 attached to body 12. Hot iron 10 also comprises magnetic member 16 coupled to applicator head 14 and arranged to attract filler material 18 to heating surface 20 of applicator head 14. In some aspects, applicator head 14 is configured to apply filler material 18 attracted to heating surface 20 against object 22. In some aspects, heating surface 20 is configured to apply heat to filler material 18 attracted to heating surface 20 to melt filler material 18 onto object 22 (e.g., melting filler material 18 over the head of fastener 30 such that the melted filler material 18 is substantially coplanar with surface 32 of object 22).

According to certain aspects, filler material 18 may comprise thermoplastic material (e.g., thermoplastic resin). The thermoplastic material may include fibrous filler that has magnetic characteristics (e.g., the fibrous filler may include iron, nickel, cobalt, magnetic ceramic, etc.). This enables hot iron 10 to pick up the thermoplastic material using magnetic member 16. In some aspects, filler material 18 may comprise any suitable material that may be used to smooth the contour of object 22 and/or any material with magnetic characteristics. In some aspects, filler material 18 may also be referred to as head filler material, head fill material, or fastener filler.

According to certain aspects, magnetic member 16 is embedded in cavity 24 of applicator head 14. However, magnetic member 16 may be placed in any suitable location provided that magnetic member 16 may attract filler material 18 to heating surface 20. In some aspects, magnetic member 16 may comprise at least one of a magnet, an electromagnet, and any other suitable magnetic source for attracting filler material 18 to heating surface 20 and has a sufficiently high melting temperature such that the magnetic field of the magnetic source can operate at the same temperature range of hot iron 10. Applicator head 14 may comprise at least one of steel, brass, iron, copper, and any other suitable material for conducting heat. Preferably, applicator head 14 comprises a material that conducts both heat and magnetic fields efficiently. In some aspects, the entire applicator head 14 may comprise a magnetic material.

Figure 2:
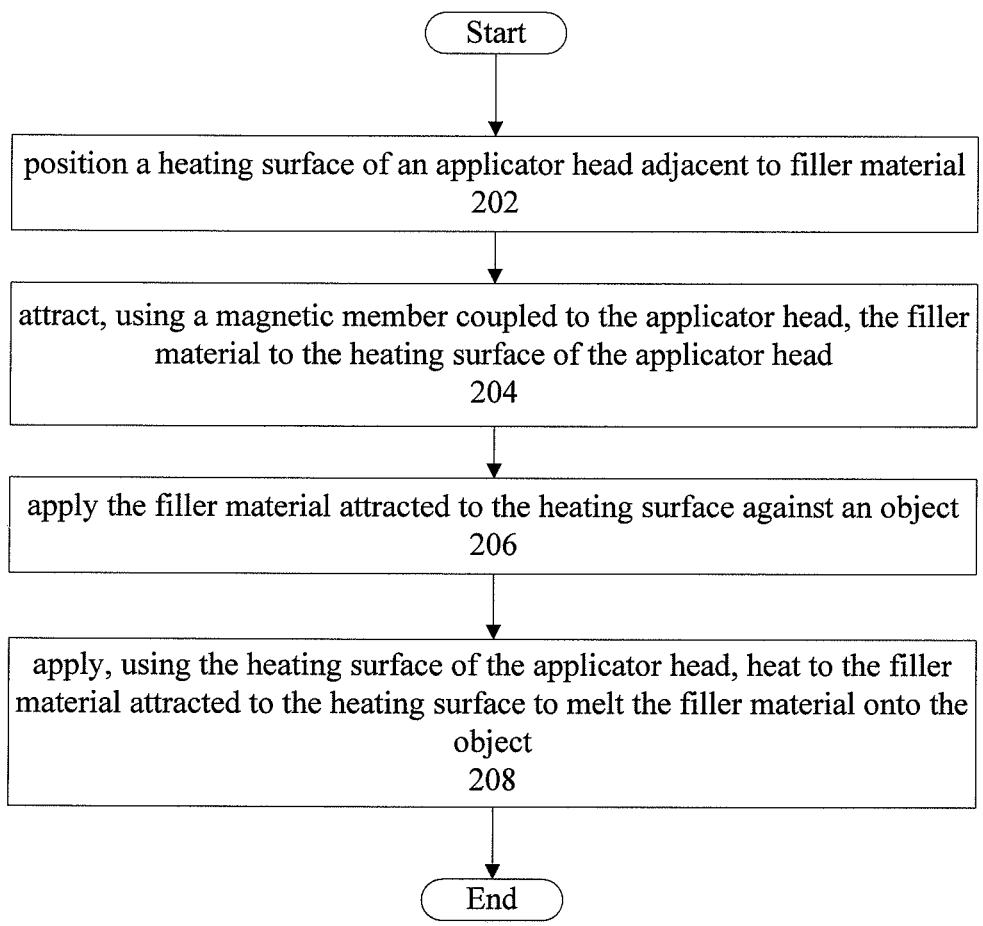
FIG. 2 illustrates an example of a method for applying filler material onto an object, in accordance with various aspects of the subject technology.
Figure 3:
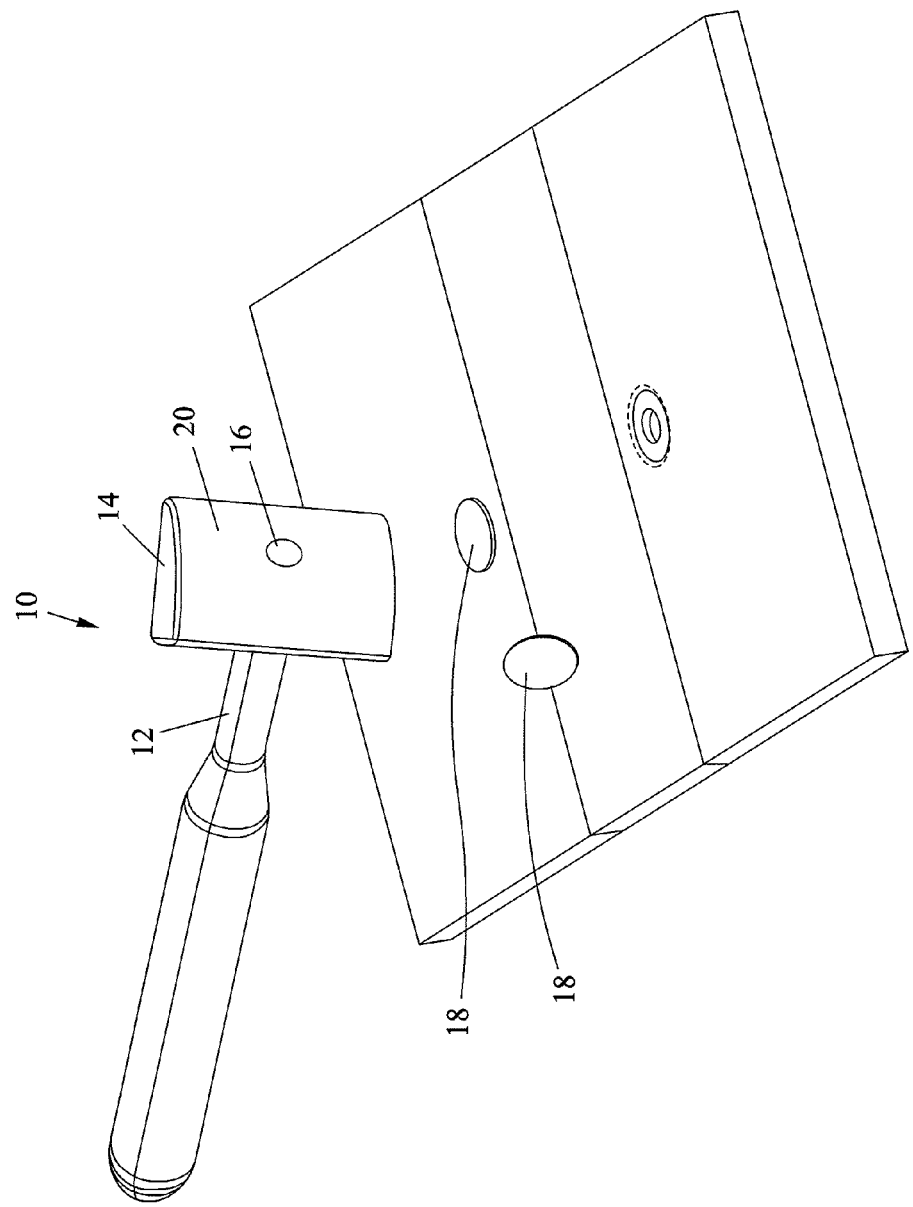
FIG. 3 illustrates a perspective view of a hot iron being positioned to pick up filler material, in accordance with various embodiments of the subject technology.
Figure 4:
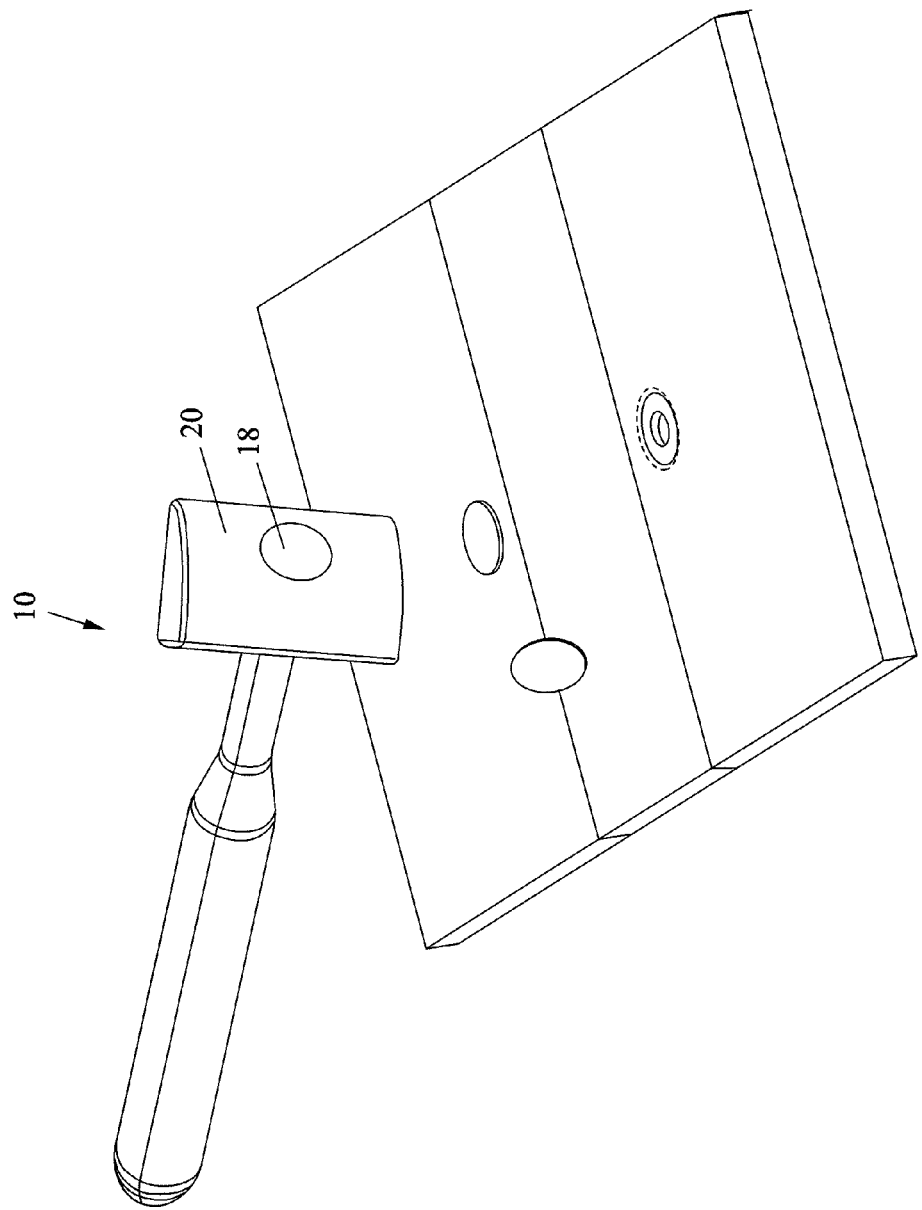
FIG. 4 illustrates a perspective view of a hot iron attracting filler material to a heating surface of an applicator head, in accordance with various aspects of the subject technology.

FIG. 2 illustrates an example of method 200 for applying filler material 18 onto object 22, in accordance with various aspects of the subject technology. Method 200 comprises positioning heating surface 20 of applicator head 14 adjacent to filler material (202). For example, FIG. 3 illustrates a perspective view of hot iron 10 being positioned to pick up filler material 18, in accordance with various embodiments of the subject technology. Applicator head 14 may be positioned at a location sufficiently near filler material 18 such that magnetic member 16 may attract filler material 18 to heating surface 20. Method 200 comprises attracting, using magnetic member 16 coupled to applicator head 14, filler material 18 to heating surface 20 of applicator head 14 (204). For example, FIG. 4 illustrates a perspective view of hot iron 10 attracting filler material 18 to heating surface 20 of applicator head 14, in accordance with various aspects of the subject technology.

According to certain aspects, magnetic member 16 is coupled to applicator head 14 such that magnetic member 16 does not come into direct contact with filler material 18 but is nevertheless able to attract filler material 18 to heating surface 20. This may allow hot iron 10 to apply filler material 18 onto object 22 while reducing the tendency of magnetic member 16 to maintain its attraction to filler material 18. For example, turning to FIG. 1, heating surface 20 comprises opening 26 that provides access to cavity 24. Opening 26 may be sized to receive magnetic member 16 into cavity 24. In some aspects, a cross-sectional area of opening 26 is less than a cross-sectional area of filler material 18. Furthermore, a distalmost end 28 of magnetic member 16 lies proximal to opening 26. Thus, filler material 18 does not come into direct contact with magnetic member 16 when magnetic member 16 is used to attract filler material 18 to heating surface 20.

Figure 5:
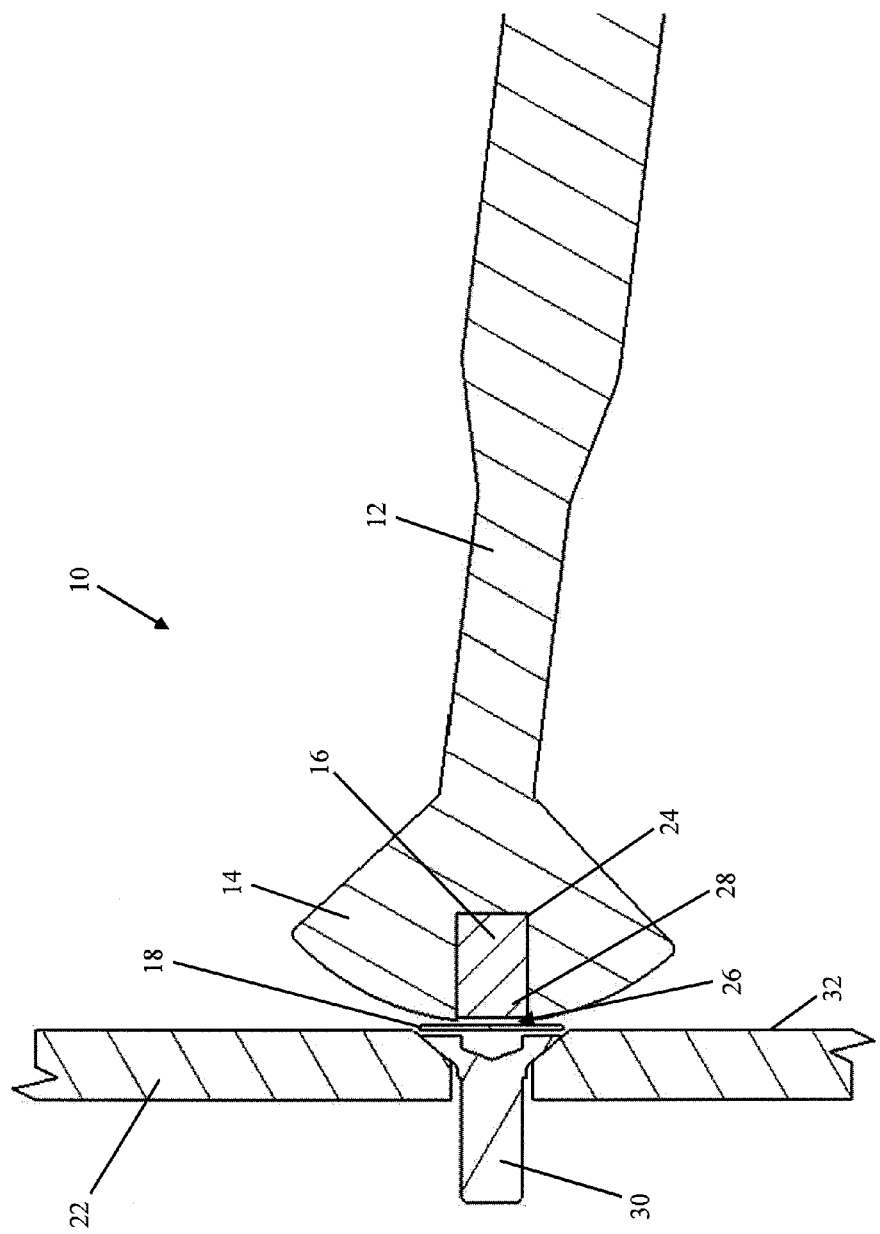
FIG. 5 illustrates a side view of a hot iron applying filler material against an object, in accordance with various aspects of the subject technology.
Figure 6:
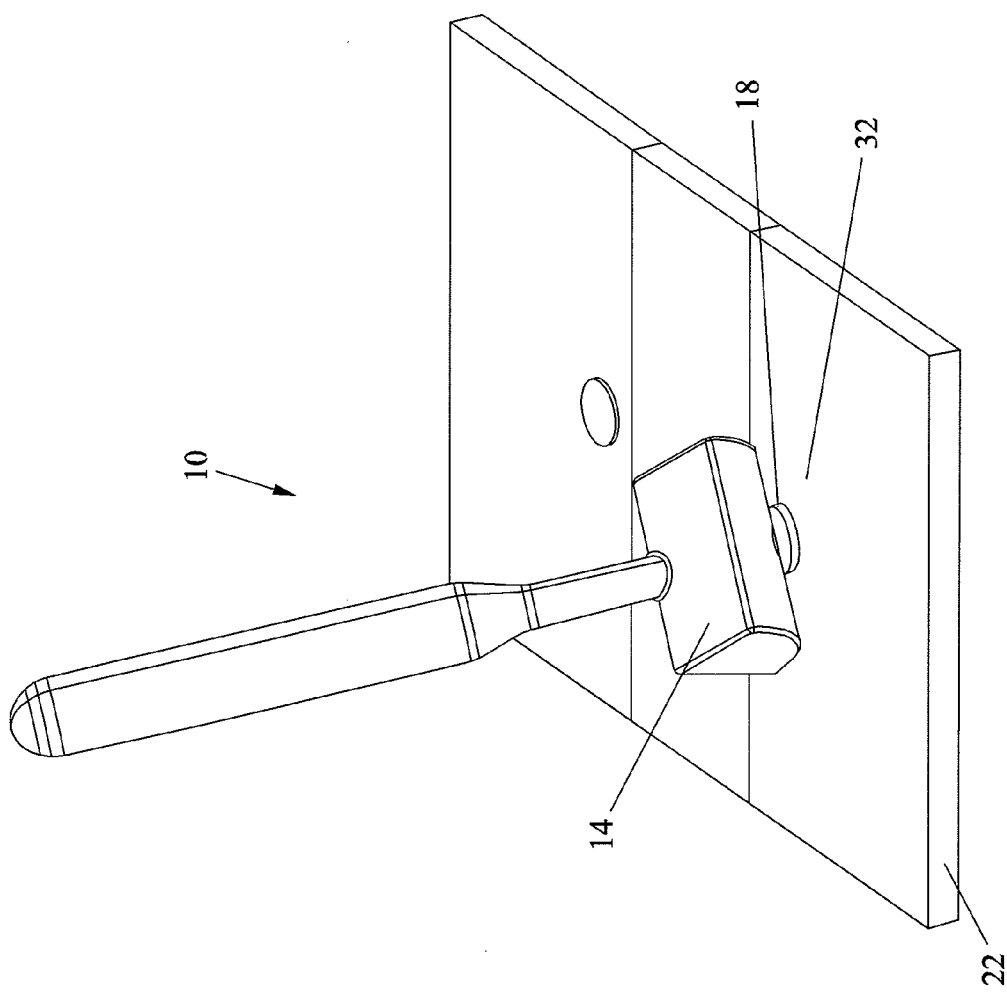
FIG. 6 illustrates a perspective view of a hot iron applying filler material against an object, in accordance with various aspects of the subject technology.

Returning to FIG. 2, method 200 comprises applying filler material 18 attracted to heating surface 20 against object 22 (206). For example, FIG. 5 illustrates a side view of hot iron 10 applying filler material 18 against object 22, in accordance with various aspects of the subject technology. Process 206 may comprise applying filler material 18 against fastener 30 on object 22. Because fastener 30 is countersunk relative to surface 32 of object 22, filler material 18 may be applied over fastener 30 to smooth the contour of object 22. FIG. 6 also illustrates a perspective view of hot iron 10 applying filler material 18 against object 22, in accordance with various aspects of the subject technology.

Figure 7:
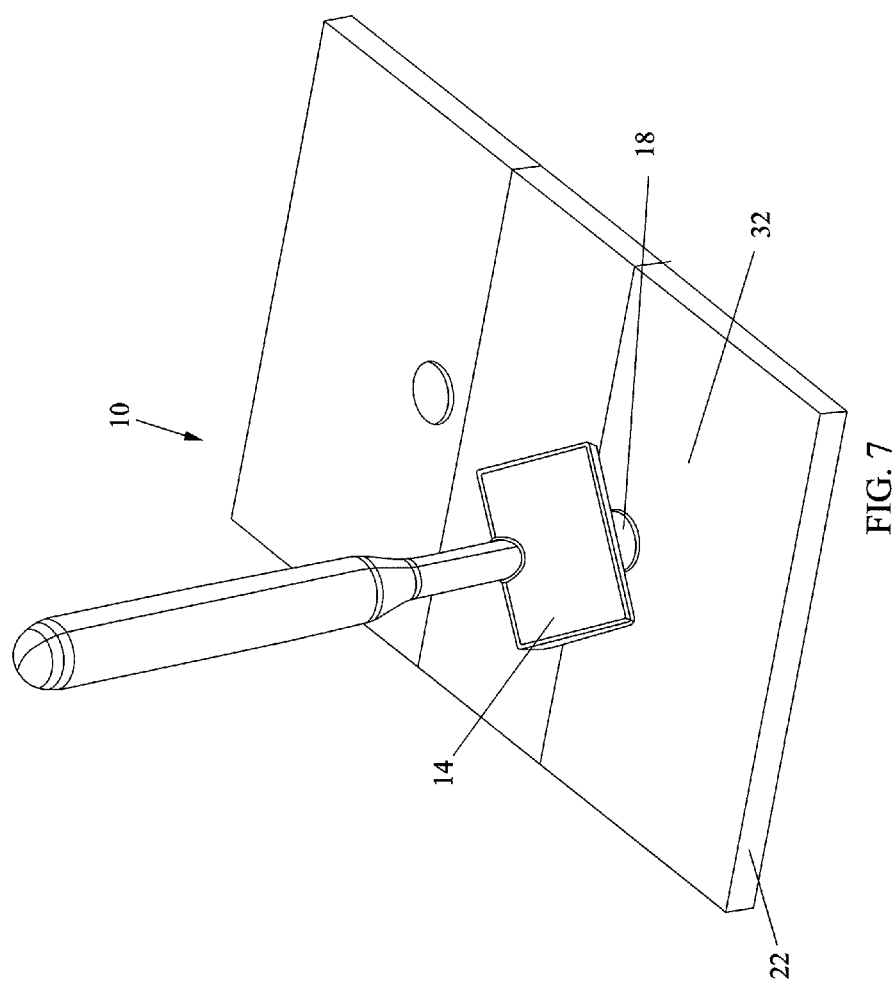
FIG. 7 illustrates a perspective view of a hot iron being used to hold filler material in position against an object, in accordance with various aspects of the subject technology.

In some aspects, method 200 comprises applying, using heating surface 20 of applicator head 14, heat to filler material 18 attracted to heating surface 20 to melt filler material 20 onto object 22 (208). This may involve using hot iron 10 to hold filler material 18 in position against object 22 for a certain duration until filler material 18 is melted onto object 22. For example, FIG. 7 illustrates a perspective view of hot iron 10 being used to hold filler material 18 in position against object 22, in accordance with various aspects of the subject technology. In some aspects, the heat applied to filler material 18 may be applied at a temperature between 200 and 800 degrees Fahrenheit. However, the heat may be applied at other suitable temperatures depending on the melting temperature of filler material 18. In some aspects, the heat applied to filler material 18 is applied for less than 30 seconds, but this duration of time may vary depending on the melting temperature of filler material 18 and/or the temperature at which the heat is applied. Filler material 18 may be melted onto object 22 such that the melted filler material 18 is coplanar with surface 32 of object 22.

The Curie temperature may be a temperature at which a magnet loses its magnetic characteristics. In this regard, a Curie temperature of magnetic member 16 (e.g., when it is a magnet) may be greater than a melting temperature of filler material 18. Thus, magnetic member 16 may be able to sufficiently attract filler material 18 to heating surface 20 even if the temperature of heating surface 20 is at the melting temperature of filler material 18.

According to certain aspects, hot iron 10 may be removed away from filler material 18 after filler material 18 is applied onto object 22, thereby overcoming the magnetic attraction between magnetic member 16 and filler material 18, because the melted filler material 18 may be sufficiently adhered to fastener 30 and/or object 22. In some aspects, hot iron 10 may be removed such that filler material 18 is physically applied against object 22 while magnetic member 16 is moved away from filler material 18, thereby reducing its magnetic attraction to filler material 18. For example, applicator head 14 may be moved in a direction such that magnetic member 16 is moved away from filler material 18 applied against object 20 during process 206 (e.g., applying filler material 18 against object 22). This direction may be a direction that is parallel to surface 32 of object 22 or some other suitable direction.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "onto," "over," "overhead" and the like as used in this disclosure should be understood as referring to an arbitrary frame of reference, rather than to the ordinary gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. An apparatus for applying filler material onto an object, the apparatus comprising:
    a body;
    an applicator head attached to the body and having a heating surface integrally formed with the applicator head; and
    a magnetic member coupled to the applicator head, embedded through the heating surface, and arranged to attract filler material to the heating surface of the applicator head,
    wherein the applicator head is configured to apply the filler material attracted to the heating surface against an object, and
    wherein the heating surface is configured to apply heat to the filler material attracted to the heating surface to melt the filler material onto the object.

2. The apparatus of claim 1, wherein the filler material comprises thermoplastic resin.

3. The apparatus of claim 1, wherein the filler material comprises at least one of iron, nickel, cobalt, and magnetic ceramic.

4. The apparatus of claim 1, wherein the applicator head comprises copper.

5. The apparatus of claim 1, wherein the magnetic member is embedded in a cavity of the applicator head, and the heating surface comprises an opening that provides access to the cavity.

6. The apparatus of claim 5, wherein the opening is sized to receive the magnetic member into the cavity.

7. The apparatus of claim 5, wherein a cross-sectional area of the opening is less than a cross-sectional area of the filler material.

8. The apparatus of claim 5, wherein a distalmost end of the magnetic member lies proximal to the opening.

9. The apparatus of claim 5, wherein the body comprises an elongate member, wherein the applicator head comprises a first end portion attached to the heating surface and a second end portion attached to the elongate member, wherein the cavity is disposed between the first end portion and the second end portion, and wherein the opening is disposed substantially in a center of the heating surface.

10. The apparatus of claim 1, wherein the magnetic member comprises a magnet, and wherein a Curie temperature of the magnet is greater than a melting temperature of the filler material.

11. The apparatus of claim 1, wherein the magnetic member comprises an electromagnet.

12. The apparatus of claim 1, wherein the heating surface is convex.

13. A method for applying filler material onto an object, the method comprising:
    positioning a heating surface of an applicator head adjacent to filler material, the heating surface integrally formed with the applicator head;
    attracting, using a magnetic member coupled to the applicator head and embedded through the heating surface, the filler material to the heating surface of the applicator head;
    applying the filler material attracted to the heating surface against an object; and
    applying, using the heating surface of the applicator head, heat to the filler material attracted to the heating surface to melt the filler material onto the object.

14. The method of claim 13, wherein the object comprises a vehicle.

15. The method of claim 13, wherein the applying the filler material against an object comprises applying the filler material against a fastener on the object.

16. The method of claim 15, wherein the fastener is countersunk relative to a surface of the object.

17. The method of claim 16, wherein the filler material is melted onto the object such that the melted filler material is coplanar with the surface of the object.

18. The method of claim 13, further comprising moving the applicator head in a direction such that the magnetic member is moved away from the filler material applied against the object during the applying the filler material against the object.

19. The method of claim 13, further comprising moving the applicator head in a direction parallel to a surface of the object during the applying the filler material against the object.

20. An apparatus for applying filler material onto an object, the apparatus comprising:
   a body;
   an applicator head attached to the body and having a heating surface, wherein the applicator head and the heating surface are formed of a single piece; and
   a magnetic member embedded in the applicator head and configured to attract filler material to the heating surface,
   wherein the applicator head is configured to apply the filler material attracted to the heating surface against an object, and
   wherein the heating surface is configured to apply heat to the filler material attracted to the heating surface to melt the filler material onto the object.

* * * * *